(12) United States Patent
Cloots et al.

(10) Patent No.: US 6,333,145 B1
(45) Date of Patent: Dec. 25, 2001

(54) METHOD FOR PREPARING A CONDUCTIVE POLYTHIOPHENE LAYER AT LOW TEMPERATURE

(75) Inventors: Tom Cloots, Londerzeel; Johan Loccufier, Zwijnaarde; Frank Louwet, Diepenbeek; Hieronymus Andriessen, Beerse, all of (BE)

(73) Assignee: Agfa-Gevaert, Mortsel (BE)

( * ) Notice: Subject to any disclaimer, the term of this patent is extended or adjusted under 35 U.S.C. 154(b) by 0 days.

(21) Appl. No.: 09/433,971

(22) Filed: Nov. 4, 1999

Related U.S. Application Data

(60) Provisional application No. 60/119,852, filed on Feb. 12, 1999.

(30) Foreign Application Priority Data

Nov. 17, 1998 (EP) .................................................. 98203951
Dec. 21, 1998 (EP) .................................................. 98204382

(51) Int. Cl.$^7$ ...................................................... G03C 1/85
(52) U.S. Cl. .................... 430/529; 430/527; 250/500; 427/398.1
(58) Field of Search ............................ 252/500; 430/527, 430/529, 531; 427/398.1

(56) References Cited

U.S. PATENT DOCUMENTS

| | | | |
|---|---|---|---|
| 5,159,040 | * 10/1992 | Jen et al. ............................. | 526/271 |
| 5,294,372 | * 3/1994 | Kochem et al. ...................... | 252/500 |
| 5,300,575 | 4/1994 | Jonas et al. . | |
| 5,354,613 | * 10/1994 | Quintens et al. .................... | 428/341 |
| 5,370,981 | 12/1994 | Krafft et al. . | |
| 5,482,655 | * 1/1996 | Vogel et al. ......................... | 252/500 |
| 5,766,515 | 6/1998 | Jonas et al. . | |
| 5,792,558 | 8/1998 | Jonas et al. . | |

FOREIGN PATENT DOCUMENTS

| | | |
|---|---|---|
| 0 803 886 A2 | 10/1997 | (EP) . |
| 0 825 219 A2 | 2/1998 | (EP) . |
| 0 825 219 A3 | 8/1998 | (EP) . |
| 0 803 886 A3 | 3/1999 | (EP) . |
| WO 98/25274 A1 | 6/1998 | (WO) . |

OTHER PUBLICATIONS

Chemical Abstracts, vol. 129, No. 21, Nov. 23, 1998, Abstract No. 277126; Shim, Myun–Ki et al: "Transparent Electric Conductive Composition, Formation And Manufacture Of Transport Electric Conductive Membrane From The Same", XP002098408 & JP 10 251518 A (Samsung Electron Devices Co., Ltd., S. Korea.
Merck Index citation of DMSO.*

* cited by examiner

*Primary Examiner*—Rosemary Ashton
(74) *Attorney, Agent, or Firm*—Breiner & Breiner, L.L.C.

(57) ABSTRACT

A method for producing a polymeric conductive layer on an object comprising the steps of:
  providing an aqueous composition containing a polythiophene, a polyanion compound and an aprotic compound with a dielectric constant, $\epsilon$, $\geqq 15$,
  applying said composition to said object forming a layer and
  drying said layer to form a conductive polymeric layer on said object,
characterised in that during said production said object and said layer are kept at a temperature below 100° C. and said conductive polymeric layer has a resistivity of at most 2 k$\Omega$/square.

9 Claims, No Drawings

METHOD FOR PREPARING A CONDUCTIVE POLYTHIOPHENE LAYER AT LOW TEMPERATURE

This application claims benefit of Prov. No. 60/119,852 filed Feb. 12, 1999.

FIELD OF THE INVENTION

This invention relates to a method for producing a polymeric conductive layer on an object. This invention relates especially to a method for producing a polymeric conductive layer of polythiophene and derivatives.

BACKGROUND OF THE INVENTION

The production and the use of electronically conductive polymers are well known in the art. In DE-A-41 32 614 the production of film-forming, electronically conductive polymers by anodic oxidation of pyrroles, thiophenes, furans or aromatic amines (or their derivatives.) is effected with a sulphone compound present in the electrolyte solution. In U.S. Pat. No. 5,254,648 the preparation of electrically-conducting polythiophenes are described. In U.S. Pat. No. 5,236,627 a method for the preparation of polypyrrole is described. There are several uses for such polymers, they can be used as electrodes in capacitors, as disclosed in, e.g., EP-A-803 886, they are useful as a replacement for metal conductors in electrostatic discharge elimination and electromagnetic shielding as disclosed in, e.g., WO-A-96/266355. The layers of electrically-conductive polymers can be shaped into "wires" or channels using conventional photolithographic techniques and can then be used as interconnects for microchip fabrication, in devices requiring controlled resistance of resistive "channels", in non-linear optics, etc. Such shaping of electrically-conductive polymers into "wires" or channels has been disclosed in U.S. Pat. No. 5,561,030. Also in WO-A-97/18944 methods for patterning electrically-conductive polymer layers are disclosed.

Many of the electrically conductive polymers can not be applied to an object from an aqueous solution but have to be applied from a composition with organic solvents, e.g. polyaniline is frequently processed from solutions in cresol. In the light of ecological needs, the need to use organic solvents is a drawback and can hamper the widespread use of electrically conductive polymers. In EP-A-440 957 a method for preparing polythiophene in an aqueous environment and applying polythiophene from an aqueous solution has been described. Such a solution is up until now mostly be used in photographic materials as disclosed in, e.g., U.S. Pat. Nos. 5,312,681, 5,354,613 and 5,391,472.

An other limiting factor in the use of electrically-conducting polymers is the fact that, when the polymer is applied in an amount leading to good conductivity, the layers are frequently coloured, which is undesired when these polymer layers are to be used as transparent electrode in LCD or electroluminescent devices. Therefore much efforts have be done to increase the conductivity of the polymers without increasing the coloration so that thin, almost colour-less layers of electrically-conductive polymers can be applied having high conductivity.

In EP-A-686 662 it has been disclosed that layers of polythiophene coated from an aqueous composition could be made with high conductivity. Therefore the aqueous composition of the polythiophene comprises further a di- or polyhydroxy compound and after coating said composition and drying the layer, the layer has to be treated at temperatures between 150 and 250° C. in a separate production step. Although the layers disclosed in EP-A-686 662 have a low resistivity of about 300 Ω/square and lower, there is still a need for a method wherein the low resistivity can be reached at lower temperature and without the need of a separate annealing step.

OBJECTS AND SUMMARY OF THE INVENTION

It is an object of the invention to provide a method for producing highly conductive layers of electrically-conducting polymers on an object without needing an additional annealing step at elevated temperatures.

It is an other object of the invention to provide an aqueous composition of an electrically conductive polymer that can be used to provide a highly conductive layer on an object.

It is a further object of the invention to provide a polymeric film carrying a highly conductive layer of an electrically conductive polymer, which can be used as electrodes in displays, e.g., LCD's, electroluminescent devices, capacitors, etc.

The objects of this invention are realised by providing a method for producing a polymeric conductive layer on an object comprising the steps of:
  providing an aqueous composition containing:
    a polythiophene,
    a polyanion compound and
    an aprotic compound with a dielectric constant, $\epsilon$, $\geq 15$,
  applying said composition to said object forming a layer and drying said layer to form a conductive polymeric layer on said object, characterised in that said object and said layer are kept at a temperature below 100° C. and said conductive polymeric layer has a resistivity of at most 2 kΩ/square.

Preferably said polythiophene has formula

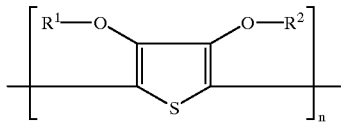

in which, each of $R^1$ and $R^2$ independently represents hydrogen or a C1–4 alkyl group or together represent an optionally substituted C1–4 alkylene group or a cycloalkylene group, preferably an ethylene group, an optionally alkyl-substituted methylene group, an optionally C1–12 alkyl- or phenyl-substituted 1,2-ethylene group, a 1,3-propylene group or a 1,2-cyclohexylene group, The objects of the invention are further realised by providing an aqueous composition containing:
  a polythiophene with formula

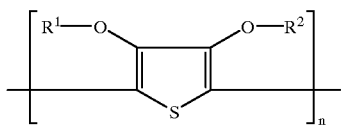

in which, each of $R^1$ and $R^2$ independently represents hydrogen or a C1–4 alkyl group or together represent an optionally substituted C1–4 alkylene group or a cycloalkylene group, preferably an ethylene group, an optionally alkyl-substituted methylene group, an optionally C1–12 alkyl- or phenyl-substituted 1,2-ethylene group, a 1,3-propylene group or a 1,2-cyclohexylene group,
  a polyanion compound and
  an aprotic compound with dielectric constant, $\epsilon$, $\geq 15$
    selected from the group consisting of sulphones, sulphoxides, organic phosphate esters, organic phosphonates, organic phosphamides, urea, derivatives of urea and mixtures thereof.

DETAILED DESCRIPTION OF THE INVENTION

It was found after experimentation that the annealing step, necessary to enhance the conductivity of a layer containing polythiophene and a di- or polyhydroxy compound could be omitted. When instead of such a di- or polyhydroxy compound, an aprotic compound (in this document aprotic is used to indicate compounds not carrying hydroxyl or carboxyl groups) with a dielectric constant, $\epsilon \geq 15$ was used, a layer of polythiophene applied to an object having a resistivity of lower than 2 k$\Omega$/square could be prepared by applying an aqueous composition with a polythiophene and said aprotic compound (Further on Compound A) to the object and simply drying it at a temperature lower than 100° C., or more preferably below 90° C. Even when the drying proceeded at a temperature lower than 50° C. a very low resistivity could be achieved. It was possible to prepare layers with a resistivity below 500 $\Omega$/square by simply drying the layer at a temperature lower than 50° C. Thus no special, separate annealing step was necessary which is advantageous since it simplifies the production process of polymeric conductive layers and makes it both less expensive and more ecological since, in the method of this invention, less calories have to be used to form the conductive layer. Furthermore the absence of an annealing step at high temperature makes it possible to use the method of this invention for applying conductive layers on stretched polymeric films, e.g. stretched polyester, that risk to shrink and curl when treated at temperatures above 120 or 150° C. Thus the method of this invention can also be used for applying conductive polymer layers on non-heat stable polymeric objects.

All resistivities in this document are measured according to the following method: A strip of the substrate coated with the conductive polymer is taken. This strip has a length of 27.5 cm and a width of 35 mm. Over the width of the strip electrodes are applied at a distance of 10 cm of each other. The electrodes are made of a conductive polymer, ECCO-COAT CC-2 available from Emerson & Cumming Speciality polymers. Over said electrode a constant potential of 1 V is applied. The current flowing through the circuit is measured on a Pico-amperemeter KEITHLEY 485. From the potential and the current, taking in account the geometry of the measurement, the resistivity in $\Omega$/square is calculated. Preferably the compound A is an aprotic solvent selected from the group of lactams, amides, sulphones, sulphoxides, organic phosphate esters, organic phosphonates, organic phosphamides, urea, derivatives of urea and mixtures thereof. Typical useful compounds A are e.g. N-methyl-2-pyrrolidone, 2 pyrrolidone, 1,3-dimethyl-2-imidazolidone, N,N,N',N'-tetramethylurea, formamide, dimethylformamide, N,N-dimethylacetamide, tetramethylene sulphone, dimethylsulfoxide, hexamethylphosphamide, etc.

Although polythiophene made by polymerisation of any thiophene derivative, non-substituted or substitute can be used in the method of this invention, the polythiophene had preferably the formula

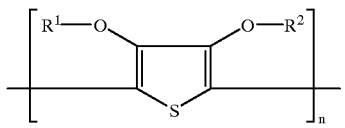

in which, each of $R^1$ and $R^2$ independently represents hydrogen or a C1–4 alkyl group or together represent an optionally substituted C1–4 alkylene group or a cycloalkylene group, preferably an ethylene group, an optionally alkyl-substituted methylene group, an optionally C1–12 alkyl- or phenyl-substituted 1,2-ethylene group, a 1,3-propylene group or a 1,2-cyclohexylene group. More preferably a polythiophene wherein $R^1$ and $R^2$ form together a —CH$_2$—CH$_2$— group is used. The preparation of such a polythiophene and of aqueous polythiophene polymeric polyanion dispersions containing said polythiophene is described in EP-A-440 957 and corresponding U.S. Pat. No. 5,300,575. Basically the preparation of said polythiophene proceeds in the presence of said polymeric polyanion compounds by oxidative polymerisation of 3,4-dialkoxythiophenes or 3,4-alkylenedioxythiophenes according to the following formula (II)

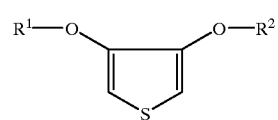

wherein:

$R^1$ and $R^2$ are as defined above, with oxidising agents typically used for the oxidative polymerisation of pyrrole and/or with oxygen or air in the presence of said polyacids, preferably in aqueous medium containing optionally a certain amount of organic solvents, at temperatures of 0 to 100° C.

The polythiophenes get positive charges by the oxidative polymerisation, the location and number of said charges is not determinable with certainty and therefore they are not mentioned in the general formula of the repeating units of the polythiophene polymer.

When using air or oxygen as the oxidising agent their introduction proceeds into a solution containing thiophene, polyacid, and optionally catalytic quantities of metal salts till the polymerisation is complete.

Oxidising agents suitable for the oxidative polymerisation of pyrrole are described, for example, in J. Am. Soc. 85, 454 (1963). Inexpensive and easy-to-handle oxidising agents are preferred such as iron(III) salts, e.g. FeCl$_3$, Fe(ClO$_4$)$_3$ and the iron(III) salts of organic acids and inorganic acids containing organic residues, likewise H$_2$O$_2$, K$_2$Cr$_2$O$_7$, alkali or ammonium persulfates, alkali perborates, potassium permanganate and copper salts such as copper tetrafluoroborate.

Theoretically, 2.25 equivalents of oxidising agent per mol of thiophene are required for the oxidative polymerisation thereof [ref. J. Polym. Sci. Part A, Polymer Chemistry, Vol. 26, p.1287 (1988)]. In practice, however, the oxidising agent is used in a certain excess, for example, in excess of 0.1 to 2 equivalents per mol of thiophene.

For the polymerisation, the thiophenes corresponding to the formula above, a polyacid and oxidising agent are dissolved or emulsified in an organic solvent or preferably in water and the resulting solution or emulsion is stirred at the envisaged polymerisation temperature until the polymerisation reaction is completed. By that technique stable aqueous polythiophene dispersions are obtained having a solids content of 0.05 to 55% by weight and preferably of 0.1 to 10% by weight.

The aqueous composition contains preferably between 0.1 and 49% by weight of said compound A, with respect to the total weight of the composition. More preferably it contains between 1 and 20% by weight of compound A, with respect to the total weight of the composition.

The aqueous composition used in the method of this invention can also comprise one or more binders and one or more surfactants. Also other ingredients, e.g., spacing particles, UV-filters, IR-absorbers, etc. Can be added to the aqueous composition when the final use of the conductive polymeric layer needs the presence of such an ingredient.

The aqueous composition is preferably applied to said object in such an amount that in the dried layer between 10 and 5000 mg polythiophene is present per m$^2$, preferably the dried layer comprises between 100 and 500 mg of polythiophene per m$^2$.

The aqueous composition can be applied to any object needing a conductive layer, the object can be flat, e.g. a polymeric film, or having a three-dimensional shape, e.g. polymeric bottles, polymeric parts of batteries, etc.

The aqueous composition according to this invention can most beneficially be used for applying a conductive coating to a flat substrate. These substrates can be inorganic or organic. Typical polymeric films that can be used are films made from, e.g., polyester (polyethyleneterephthalate, polyethlenenaphthalate, etc.), polystyrene, polycarbonate, polyacrylate, polyamide, polyimides, cellulosetriacetate, polyolefines, polyvinylchloride, etc. Also inorganic substrates can be coated with an aqueous composition containing polythiophene, a polyanion and compound A, suitable substrate are, e.g., Si, ceramics, oxides, e.g., Indium-Tin oxide, glass, polymeric film reinforced glass, flexible glass/polymeric film laminates, etc. The latter is a very good support for the conductive layer made according to the method of this invention, since such a material can be very thin (even in the order of 10 to 400 μm) and still give both the dimensional stability of glass and the flexibility of the polymeric film. When using layers made of aqueous composition containing polythiophene, a polyanion and compound A for use as transparent electrode in Displays, e.g., LCD's and electroluminescent devices, the use of polymeric film reinforced glass as support for the electrode is very useful.

In the method of this invention, the aqueous composition can be applied to the object by any means known in the art: it can be spin-coated, sprayed on the object, it can also be coated by any of the continuous coating techniques that are used to coat solutions on running webs, e.g. dip coating, rod coating, blade coating, air knife coating, gravure coating, reverse roll coating, extrusion coating, slide coating and curtain coating. An overview of these coating techniques can be found in the book "Modern Coating and Drying Technology", Edward Cohen and Edgar B. Gutoff Editors, VCH publishers, Inc, New York, N.Y., 1992. When the layer with low resistivity made by the method of this invention has to be covered by, e.g. a hole transport layer or a electron transport layer, it is possible to coat simultaneously multiple layers by coatings technique known as useful for the simultaneous coating of multiple layers as e.g. slide coating, curtain coating etc.

It is possible in the method of this invention to apply the aqueous composition to the substrate by printing techniques, e.g., ink-jet printing, gravure printing, flexo printing, offset printing etc. In this case the composition can be applied directly in the form of electrode patterns.

A layer applied to a substrate by a method according to this invention, can be patterned by using conventional photolithographic techniques as disclosed in, e.g., U.S. Pat. No. 5,561,030 and WO-A-97/18944.

Layers with low resistivity, made by the method according to this invention can be used in any application wherein thin electrodes, preferably transparent electrodes, on a substrate are used. Such uses include, amongst others, displays, e.g., LCD's, electroluminescent displays, LED's, etc.

The present invention encompasses also an aqueous composition containing:

a polythiophene a polyanion compound and an aprotic compound with dielectric constant, ε, ≧15 selected from the group consisting of sulphones, sulphoxides, organic phosphates esters, organic phosphonates, organic phosphamides, urea, derivatives of urea and mixtures thereof. In such a composition, the polythiophene has preferably the formula

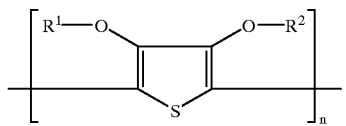

in which, each of R$^1$ and R$^2$ independently represents hydrogen or a C1–4 alkyl group or together represent an optionally substituted C1–4 alkylene group or a cycloalkylene group, preferably an ethylene group, an optionally alkyl-substituted methylene group, an optionally C1–12 alkyl- or phenyl-substituted 1,2-ethylene group, a 1,3-propylene group or a 1,2-cyclohexylene group,

EXAMPLES

1 Preparation of the polythiophene dispersion (PT) (hereinafter called dispersion PT)

a) Into 1000 ml of an aqueous solution of 14 g of polystyrene sulphonic acid (218 mmol of SO$_3$H groups) with number-average molecular weight (Mn) 40,000, were introduced 12.9 g of potassium peroxodisulfate (K$_2$S$_2$O$_8$), 0.1 g of Fe$_2$(SO$_4$)3 and 5.68 g of 3,4-ethylenedioxythiophene. The thus obtained reaction mixture was stirred for 24 h at 20° C. and subjected to desalting. b) 500 ml of the above prepared reaction mixture were diluted with 500 ml of water and stirred for 6 hours at room temperature in the presence of a granulated weak basic ion exchange resin LEWATIT H 600 (trade name of Bayer AG, Leverkusen, Germany) and strongly acidic ion exchanger LEWATIT S 100 (trade name of Bayer AG, Leverkusen, Germany). After said treatment the ion exchange resins were filtered off and the potassium ion and sulphate ion content were measured which were respectively 0.4 g K$^+$ and 0.1 g (SO4)$^{2-}$ per liter.

Example 1

417 ml of dispersion PT and 50 g of methylpyrrolidone (compound A) were mixed with a binder (8.5 ml of a 30% dispersion of co(vinylidenechloride/methylacrylate/itaconic acid 88/10/2) and a surfactant (0.5 ml of FLUORAD FC430, trade name of 3M) and the mixture was brought to 1000 ml with distilled water.

This mixture was coated on a 100 μm thick polyethyleneterephthalate film whereon a subbing layer (as usual on supports for photographic material) was present. The mixture was a wet thickness of 40 μm, and dried under the conditions indicated in Table 1. The dried layer contained 200 mg/m$^2$ of polythiophene. The values of resistivity, listed in Table 1, were measured as described above. The net optical density of the layer was between 0.08 and 0.10 for all samples.

TABLE 1

| Drying time (sec) | Drying temperature (° C.) | Resitivity (?/square) |
|---|---|---|
| 1 | 30 | (sample was not dry) |
| 1 | 50 | 990 |
| 1 | 90 | 1000 |
| 1 | 120 | 1000 |
| 2 | 30 | 840 |
| 2 | 50 | 960 |
| 2 | 90 | 1000 |
| 2 | 120 | 1100 |
| 4 | 30 | 770 |
| 4 | 50 | 1200 |
| 4 | 90 | 1300 |
| 4 | 120 | 1300 |

Example 2

Example 1 was repeated except that t he mixture was coated at a wet thickness of 100 mµ. The layer was dried at a temperature of 35° C. during 4 seconds and contained 500 mg/m² of polythiophene.

The resistivity in Ω/square was measured as described above and was 330 Ω/square.

Example 3

Example 1 was repeated except that 1,3-dimethyl-2-imidazolidinone was used instead of N-methylpyrrolidone. The layer temperature of 35° C. during 4 seconds. The resistivity in Ω/square was measured as described above and was 800 Ω/square.

Example 4

Example 1 was repeated except that 2-pyrrolidone was used instead of N-methylpyrrolidone. The layer was dried at a temperature of 35° C. during 4 seconds. The resistivity in Ω/square was measured as described above and was 700 Ω/square.

Example 5

Example 1 was repeated except that N,N,N',N'- tetramethylurea was used instead of N-methylpyrrolidone. The layer was dried at a temperature of 35° C. during 4 seconds. The resistivity in Ω/square was measured as described above and was 1900 Ω/square.

Example 6

Example 1 was repeated except that formamide was used instead of N-methylpyrrolidone. The layer was dried at a temperature of 35° C. during 4 seconds. The resistivity in Ω/square was measured as described above and was 750 ΩL/square.

Example 7

Example 1 was repeated except that tetramethylenesulphone was used instead of N-methylpyrrolidone. The layer was dried at a temperature of 35° C. during 4 seconds. The resistivity in Ω/square was measured as described above and was 1500 Ω/square.

Example 8

Example 1 was repeated except that N,N-dimethylacetamide was used instead of N-methylpyrrolidone. The layer was dried at a temperature of 35° C. during 4 seconds. The resistivity in Ω/square was measured as described above and was 1000 Ω/square.

Comparative Example

Example 1 was repeated, but instead of compound A, 22.5 mg of sorbitol was added. The layer was dried at a temperature of 35° C. during 4 seconds. The resistivity was >10⁶ Ω/square. Only after annealing at 200° C. for 90 sec, a resistivity of 1000 Ω/square was reached.

It is clear that in the method of this invention the annealing step can be omitted and still a very low resistivity can be reached.

What is claimed is:

1. A method for producing a polymeric conductive layer on an object comprising the steps of:

providing an aqueous composition containing
a polythiophene,
a polyanion compound and
an aprotic compound with a dielectric constant, $\epsilon$, $\geq 15$;

applying said composition to said object forming a layer; and drying said layer to form a conductive polymeric layer on said object, wherein said object and said layer are kept at a temperature below 100° C. and said conductive polymeric layer has a resistivity of at most 2 kΩ/square.

2. A method according to claim 1, wherein said polythiophene has the following formula:

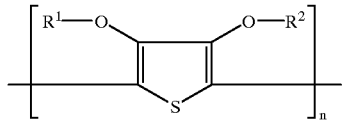

wherein each of $R^1$ and $R^2$ independently represents hydrogen or a C1–4 alkyl group or together represent a C1–4 alkylene group or a cycloalkylene group, preferably an ethylene group, a methylene group, an alkyl- or phenyl-substituted 1,2-ethylene group, a 1,3-propylene group or a 1,2-cyclohexylene group.

3. A method according to claim 1, wherein said object and said layer are kept at a temperature below 50° C.

4. A method according to claim 1, wherein, in said polythiophene, $R^1$ and $R^2$ together form a —CH₂—CH₂— group.

5. A method according to claim 1, wherein said aprotic compound is selected from the group of lactams, amides, sulphones, sulphoxides, organic phosphates esters, organic phosphonates, organic phosphamides, urea, derivatives of urea and mixtures thereof.

6. A method according to claim 1, wherein said object is a polymeric film.

7. A method according to claim 1, wherein said object is a flexible glass/polymeric film laminate.

8. A method according to claim 6 or 7, wherein said polymeric conductive layer is further patterned so as to form an electrode pattern on said film.

9. A coatable aqueous composition comprising a polythiophene,
a polyanion compound and
an aprotic compound with dielectric constant, $\epsilon$, $\geq 15$ selected from the group consisting of sulphones, sulphoxides, organic phosphate esters, organic phosphonates, organic phosphamides, urea, derivatives of urea, and mixtures thereof, wherein said polyanion-compound is polystyrene sulfonic acid and said polythiophene has a formula as follows:

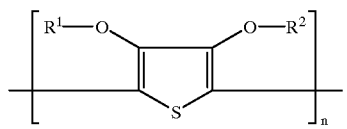

wherein each of $R^1$ and $R^2$ independently represents hydrogen or a C1–4 alkyl group or together represent an optionally substituted C1–4 alkylene group or a cycloalkylene group, an optionally alkyl-substituted methylene group, an optionally C1–12 alkyl- or phenyl-substituted 1,2-ethylene group, a 1,3-propylene group or a 1,2-cyclohexylene group.

* * * * *